United States Patent
Sorski et al.

(10) Patent No.: US 12,368,931 B1
(45) Date of Patent: Jul. 22, 2025

(54) MULTIMEDIA CONTENT MANAGEMENT USING REDUCED REPRESENTATIONS

(71) Applicant: LUMANA INC., Sunnyvale, CA (US)

(72) Inventors: Edan Sorski, Tel Aviv (IL); Sagi Ben Moshe, Ein Ayala (IL); Roy Michael, Herzliya (IL)

(73) Assignee: LUMANA INC., Sunnyvale, CA (US)

( * ) Notice: Subject to any disclaimer, the term of this patent is extended or adjusted under 35 U.S.C. 154(b) by 0 days.

(21) Appl. No.: 19/170,235

(22) Filed: Apr. 4, 2025

(51) Int. Cl.
*H04N 21/482* (2011.01)

(52) U.S. Cl.
CPC .................................. *H04N 21/482* (2013.01)

(58) Field of Classification Search
CPC .................................................... H04N 21/482
See application file for complete search history.

(56) References Cited

U.S. PATENT DOCUMENTS

| | | | |
|---|---|---|---|
| 10,223,604 B2 | 3/2019 | Bahl et al. |
| 11,238,093 B2 | 2/2022 | Ayush et al. |
| 11,842,727 B2 | 12/2023 | Metallinou et al. |
| 11,862,171 B2 | 1/2024 | Li et al. |
| 11,886,828 B1 | 1/2024 | Gray et al. |
| 11,947,923 B1 | 4/2024 | Jain et al. |
| 11,977,854 B2 | 5/2024 | Tunstall-Pedoe et al. |
| 11,989,527 B2 | 5/2024 | Tunstall-Pedoe et al. |
| 11,995,412 B1 | 5/2024 | Mishra |
| 12,073,180 B2 | 8/2024 | Tunstall-Pedoe et al. |
| 2022/0383864 A1 | 12/2022 | Gruber et al. |
| 2023/0042224 A1 | 2/2023 | Patel et al. |
| 2023/0326212 A1 | 10/2023 | Chawda et al. |
| 2024/0062067 A1 | 2/2024 | Hu et al. |
| 2024/0205405 A1 | 6/2024 | Tanaka et al. |
| 2024/0252048 A1 | 8/2024 | Tran |
| 2024/0347059 A1 | 10/2024 | Manjunath et al. |
| 2025/0053732 A1 | 2/2025 | Itani |

FOREIGN PATENT DOCUMENTS

| | | |
|---|---|---|
| CN | 116541490 A | 8/2023 |
| CN | 117725259 A | 3/2024 |
| CN | 117743610 A | 3/2024 |
| CN | 117972127 A | 5/2024 |
| CN | 118051635 A | 5/2024 |
| WO | 2023161630 A1 | 8/2023 |

*Primary Examiner* — Rong Le
(74) *Attorney, Agent, or Firm* — M&B IP Analysts, LLC

(57) ABSTRACT

A system and method for content management. A method includes identifying snapshots for a multimedia content item, wherein each snapshot is a subset of the multimedia content item corresponding to a portion of the multimedia content item; generating an array including elements based on the multimedia content item and the snapshots, wherein each element corresponds to a respective portion of the multimedia content item, wherein each element has a value indicating whether the corresponding portion of the multimedia content item has a snapshot, wherein each element has a data size that is less than a data size of each snapshot; and providing the array, wherein the provided array is utilized to retrieve at least one of the snapshots in order to present the retrieved snapshots.

19 Claims, 7 Drawing Sheets

MULTIMEDIA CONTENT MANAGEMENT USING REDUCED REPRESENTATIONS

TECHNICAL FIELD

The present disclosure relates generally to multimedia content management, and more specifically to leveraging reduced representations for snapshot management.

BACKGROUND

Multimedia content providers may present previews of their content by taking portions of the content and using those portions as representations of the broader content. For example, video providers may utilize frames from the video as still images to act as video thumbnails. A thumbnail may therefore effectively represent the video in a manner that conveys some information about the contents of the video without requiring transmitting or processing the entire video in order to convey. Similarly, frames of the video taken as snapshots of different points in time of the video may be used to preview different parts of the video.

Thumbnails and snapshots may therefore allow for conveniently previewing multimedia content. Solutions that further improve upon use of thumbnails and snapshots would therefore be desirable.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for content management. The method comprises: identifying a plurality of snapshots for a multimedia content item, wherein each snapshot is a subset of the multimedia content item corresponding to a portion of the multimedia content item among a plurality of portions of the multimedia content item; generating an array including a plurality of elements based on the multimedia content item and the plurality of snapshots, wherein each element of the plurality of elements corresponds to a respective portion of the plurality of portions of the multimedia content item, wherein each element has a value indicating whether the corresponding portion of the multimedia content item has a snapshot of the plurality of snapshots, wherein each element has a data size that is less than a data size of each snapshot of the plurality of snapshots; and providing the array, wherein the provided array is utilized to retrieve at least one snapshot of the plurality of snapshots in order to present the retrieved at least one snapshot.

Certain embodiments disclosed herein also include a non-transitory computer-readable medium having stored thereon causing a processing circuitry to execute a process, the process comprising: identifying a plurality of snapshots for a multimedia content item, wherein each snapshot is a subset of the multimedia content item corresponding to a portion of the multimedia content item among a plurality of portions of the multimedia content item; generating an array including a plurality of elements based on the multimedia content item and the plurality of snapshots, wherein each element of the plurality of elements corresponds to a respective portion of the plurality of portions of the multimedia content item, wherein each element has a value indicating whether the corresponding portion of the multimedia content item has a snapshot of the plurality of snapshots, wherein each element has a data size that is less than a data size of each snapshot of the plurality of snapshots; and providing the array, wherein the provided array is utilized to retrieve at least one snapshot of the plurality of snapshots in order to present the retrieved at least one snapshot.

Certain embodiments disclosed herein also include a system for content management. The system comprises: a processing circuitry; and a memory, the memory containing instructions that, when executed by the processing circuitry, configure the system to: identify a plurality of snapshots for a multimedia content item, wherein each snapshot is a subset of the multimedia content item corresponding to a portion of the multimedia content item among a plurality of portions of the multimedia content item; generate an array including a plurality of elements based on the multimedia content item and the plurality of snapshots, wherein each element of the plurality of elements corresponds to a respective portion of the plurality of portions of the multimedia content item, wherein each element has a value indicating whether the corresponding portion of the multimedia content item has a snapshot of the plurality of snapshots, wherein each element has a data size that is less than a data size of each snapshot of the plurality of snapshots; and provide the array, wherein the provided array is utilized to retrieve at least one snapshot of the plurality of snapshots in order to present the retrieved at least one snapshot.

Certain embodiments disclosed herein include a method, non-transitory computer-readable medium, or system as noted above or below, further including or being configured to perform the following step or steps: storing the plurality of snapshots with a plurality of time references, wherein each time reference is utilized to retrieve a corresponding snapshot of the plurality of snapshots when the array is provided.

Certain embodiments disclosed herein include a method, non-transitory computer-readable medium, or system as noted above or below, further including or being configured to perform the following step or steps: determining a time for each of the plurality of snapshots with respect to the multimedia content item, wherein the array is generated based further on the determined time for each of the plurality of snapshots.

Certain embodiments disclosed herein include a method, non-transitory computer-readable medium, or system as noted above or below, wherein the corresponding portion of the multimedia content item for each element of the plurality of elements has a same size as the corresponding portion of the multimedia content item for each other element of the plurality of elements.

Certain embodiments disclosed herein include a method, non-transitory computer-readable medium, or system as noted above or below, further including or being configured to perform the following step or steps: determining a timeframe for the array based on metadata of the multimedia content item, wherein the array is generated based further on the determined timeframe, wherein the timeframe for the array has a start time corresponding to a beginning of a day and an end time corresponding to an end of the day.

Certain embodiments disclosed herein include a method, non-transitory computer-readable medium, or system as noted above or below, further including or being configured to perform the following step or steps: receiving a request indicating a multimedia content item from a requesting device; identifying the array based on the request, wherein the identified array is provided to the requesting device.

Certain embodiments disclosed herein include a method, non-transitory computer-readable medium, or system as noted above or below, wherein the value of at least a portion of the plurality of elements further includes a suffix, wherein each suffix indicates at least one characteristic of the element having the value including the suffix.

Certain embodiments disclosed herein include a method, non-transitory computer-readable medium, or system as noted above or below, wherein each suffix indicates that the element having the value including the suffix demonstrates any of: an event, and an attribute.

Certain embodiments disclosed herein include a method, non-transitory computer-readable medium, or system as noted above or below, wherein the value of each element is a binary value.

Certain embodiments disclosed herein include a method, non-transitory computer-readable medium, or system as noted above or below, wherein the array is provided based on a set of outputs of a language model, further including or being configured to perform the following step or steps: querying the language model based on a request including natural language text in order to obtain the set of outputs of the language model, wherein the set of outputs of the language model indicates the array.

Certain embodiments disclosed herein include a method, non-transitory computer-readable medium, or system as noted above or below, further including or being configured to perform the following step or steps: providing at least one tool to the language model, wherein the language model is configured to utilize the at least one tool in order to access data related to the array, wherein the language model is configured to generate the set of outputs of the language model using the data related to the array.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
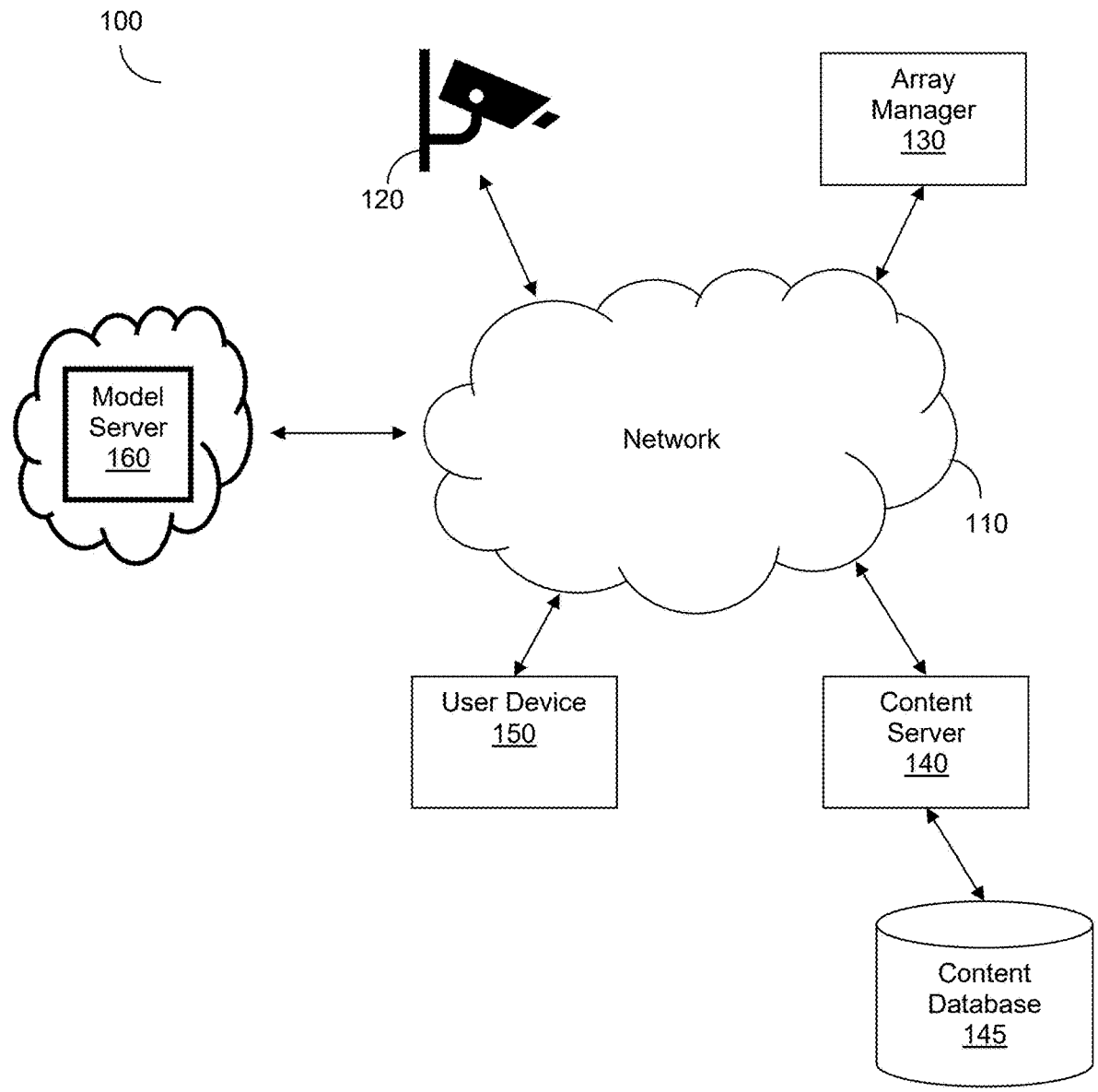
FIG. 1 is a network diagram utilized to describe various disclosed embodiments.

The various disclosed embodiments include techniques for managing multimedia content using reduced representations. Various disclosed embodiments utilize reduced representation arrays to represent data relating to multimedia content in order to facilitate snapshot retrieval which provides benefits in terms of processing and network transmission efficiency as well as data security.

In an embodiment, snapshots or references to snapshots are obtained from a device which captures or otherwise collects multimedia content. Each snapshot is a subset of the multimedia content such as, but not limited to, a frame of a video. Reduced representation arrays are generated for respective multimedia content items based on the snapshots. Each reduced representation array is an array of elements corresponding to a respective multimedia content item (e.g., a respective video from a given timeframe).

In a further embodiment, the elements in each reduced representation array include multiple elements representing respective subsets of the corresponding multimedia content item. As a non-limiting example, each element may represent a time interval (e.g., a 2 second interval) at a respective time relative to a starting time (e.g., 0 seconds) for the multimedia content item.

Each element in the array has a corresponding value, where the value of each element in the array at least indicates whether the respective subset of the multimedia content item has a corresponding snapshot (e.g., a snapshot taken from the multimedia content item at a time which is within the time interval of the subset). As a non-limiting example, an array may be realized as a bit representation for a video in which each element of the array has a value of either 0 or 1, where 0 represents that there is no snapshot for the corresponding 2 second interval of the video and where 1 represents that there is a snapshot for the corresponding 2 second interval of the video.

In some embodiments, the arrays may be realized using values other than 0 and 1. As a non-limiting example, values such as 2, 3, and 4 may be utilized as indicators of additional information beyond whether the subset of the multimedia content item has a respective snapshot. As a further example, values such as 2, 3, and 4 may be utilized to represent respective events or attributes (e.g., attributes of objects or people shown in video) when such an event or attribute is represented by a snapshot at the time interval corresponding to the element having that value, while a value of 1 may be utilized to represent the existence of a snapshot when no such event or attribute is identified for that snapshot.

In various embodiments, each element representing the existence of a snapshot stores an amount of data which is lower than an amount of data of the corresponding snapshot whose existence is represented by that element. As a non-limiting example, an element representing a time interval within a video which has a corresponding snapshot in the form of a video frame will store a bit representation or other value which is smaller in size than the corresponding snapshot. In this regard, the reduced representation of the snapshots realized by each array may have a lower total amount of data than the total amount of data contained within the snapshots. As discussed herein, this allows for more efficiently transmitting and processing the arrays as compared to transmitting and processing the underlying snapshots.

The snapshots may be stored in association with respective time references defined with respect to the arrays (for example, using the same time intervals or other subset scheme used to define the subsets of the multimedia content) such that the arrays may be translated into such time references in order to retrieve appropriate snapshots. The arrays may be translated dynamically as needed (e.g., when a snapshot for a given subset of the multimedia content is needed), and may be translated by a user device or other system which is playing the multimedia content and therefore may utilize snapshots (for example, to preview portions of the multimedia content). To this end, such a user device or system may be provided a translation table or other rules for translating the arrays, for example in order to determine which portions of the multimedia content have snapshots and to identify where those snapshots are located in storage in order to enable retrieving the snapshots.

In some embodiments, the snapshots are made accessible to users via one or more language models such as, but not limited to, large language models (LLMs). More specifically, the language models may be provided access to tools such as functions which enable the language models to retrieve the reduced representation arrays or otherwise obtain data about the reduced representation arrays, which in turn may be utilized by the language models to respond to queries. Such functions may be or may include, a function configured to analyze reduced representation arrays in order to identify snapshots for different portions of media content, a function configured to analyze reduced representation arrays in order to determine statistical information about the snapshots (for example, a number of snapshots in a given media content item, a number of snapshots demonstrating certain attributes in a given media content item, a number of media content items having one or more snapshots demonstrating certain attributes, etc.).

The functions may be configured to receive inputs indicating data to be used for searching or analyzing the arrays such as, but not limited to, identifiers of certain media content items, indicators of whether portions of media content include snapshots, which portions of media content demonstrate certain attributes, combinations thereof, and the like. To this end, the functions may be configured with the values used by the reduced representation arrays in order to allow the functions to identify these values within the arrays pursuant to returning responses to function calls. The functions may further have access to one or more storage locations in which reduced representation arrays and the corresponding references to media content are stored.

The language models may determine which function or functions to call based on text included in requests for snapshots or for information about snapshots (for example, which media content has snapshots or has snapshots demonstrating certain attributes) represented by the reduced representation arrays. To this end, providing access to the functions for the language models may further include providing a textual description of one or more aspects of each function such as, but not limited to, text to be used for calling the function, example inputs, example outputs, a textual explanation of how the function is used, combinations thereof, and the like.

The disclosed embodiments may be utilized in order to more efficiently communicate information about snapshots than providing the snapshots directly. That is, such reduced representations may be transmitted more efficiently than the snapshots. Moreover, the reduced representations may be utilized to retrieve the snapshots dynamically as needed (e.g., when a snapshot is to be used) such that only the needed snapshots may be accessed.

Additionally, the reduced representations as discussed herein may be utilized to improve data security and privacy related to the snapshots. That is, the reduced representations may be realized using arbitrary values or otherwise using values which lack meaning without the corresponding translation data. Accordingly, compromising the reduced representation arrays (for example, by intercepting them in transit) will not allow the compromising entity to learn information about the snapshots. In particular, when additional information is represented by the values of the array elements (e.g., when values represent certain events or attributes), the values cannot be used to glean such additional information unless the entity using the array also has access to the translation data.

FIG. 1 shows an example network diagram 100 utilized to describe the various disclosed embodiments. In the example network diagram 100, a camera 120, an array manager 130, a content server 140, a user device 150, and a model server 160 communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The camera 120 is configured to capture multimedia in forms such as, but not limited to, images or video. In a non-limiting example implementation, the camera 120 is configured to capture video content to be represented via snapshots in the forms of frames or other still images representing respective portions of the video content. Content captured by the camera 120 may be sent, for example, to the content server 140 for processing and storage in a content database 145. In some implementations, the camera 120 may periodically capture frames to be used as snapshots of video content and to send the frames to the content server 140 for storage.

It should be noted that a camera is depicted in FIG. 1 for simplicity purposes, but that other types of sensors or devices configured to capture kinds of content other than video may be utilized without departing from the scope of at least some disclosed embodiments.

The array manager 130 is configured to create reduced representation arrays to be used for managing multimedia content as described herein. More specifically, the array manager 130 is configured to generate arrays including elements having values representing aspects of multimedia content such as, but not limited to, whether a given time interval of a multimedia content item has a snapshot, whether an event or attribute is demonstrated by a given time interval of the multimedia content item, and the like. The reduced representation arrays are created according to a predetermined scheme which can be decoded via a translation table, set of rules, or combination thereof.

The reduced representation arrays allow for conveying information used to determine whether a snapshot should be retrieved and how to retrieve the snapshot (for example, by identifying which time interval is associated with the snapshot in a location of storage of the snapshot). Further, the reduced representation arrays allow for conveying that information using fewer computing resources, which in turn may allow for retrieving snapshots more efficiently. The reduced representation arrays may be provided to, for example, the user device 150, and dynamically translated in order to allow the user device 150 to retrieve the applicable snapshots as needed.

The content server 140 is configured to manage multimedia content. As a non-limiting example, the content server 140 may be configured to store multimedia content in the content database 145 and to retrieve the multimedia content from the content database 145 in order to serve the content, for example, to the user device 150 or otherwise to provide the content for playing on a system or device. The content server 140 may be further configured to store snapshots which are subsets of the multimedia content, and to store such snapshots with respect to the reduced representation arrays created by the array manager 130. As a non-limiting example, different snapshots represented by such an array may correspond to timestamps of the multimedia content, and the snapshots may be stored in association with their corresponding timestamps based on the organization of the array for the multimedia content.

The user device 150 may be, but is not limited to, a personal computer, a laptop, a tablet computer, a smartphone, a wearable computing device, or any other device capable of receiving and displaying, projecting, or otherwise playing multimedia content. A non-limiting example hardware layer which may be utilized to realize the user device 150 is discussed below with respect to FIG. 6.

In some embodiments, the array manager 130 is configured to respond to requests related to the arrays managed by the array manager 130 where the requests are or include natural language text. Such requests may be received, for example, from the user device 150 based on user inputs provided by a user of the user device 150. In such embodiments, the array manager 130 may utilize one or more language models (not shown) such as, but not limited to, large language models (LLMs). To this end, the array manager 130 may communicate with the model server 160, which is configured to apply or otherwise access such language models. The array manager 130 may also transmit data defining functions which may be called by the model server 160 or otherwise by the language model in order to instruct the array manager 130 to retrieve relevant data about arrays managed by the array manager 130.

It should be noted that FIG. 1 depicts an implementation of various disclosed embodiments, but that at least some disclosed embodiments are not necessarily limited as such. Other deployments, arrangements, combinations, and the like, may be equally utilized without departing from the scope of the disclosure.

Figure 2:
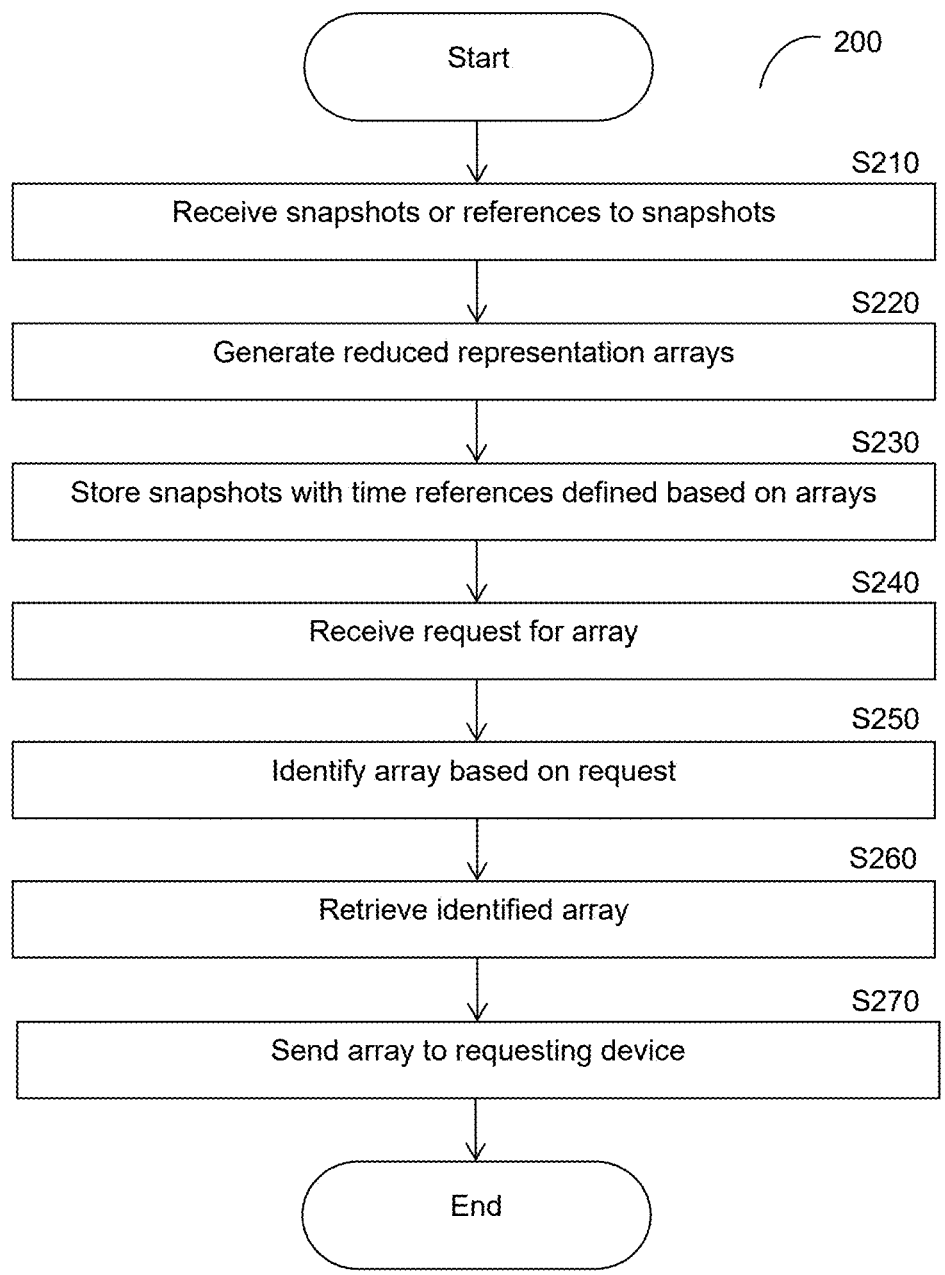
FIG. 2 is a flowchart illustrating a process for facilitating snapshot retrieval using reduced representation arrays.

FIG. 2 is a flowchart 200 illustrating a process for facilitating snapshot retrieval using reduced representation arrays. In an embodiment, the method is performed by the array manager 130, FIG. 1.

At S210, snapshots to be represented via reduced representation arrays are identified. The snapshots may be identified as received snapshots or may be identified with respect to locations (for example, locations in storage. To this end, in an embodiment, S210 includes receiving the snapshots or references to the snapshots (for example, links pointing to locations in storage of the snapshots). Each snapshot may be among a set of one or more snapshots, where each set of snapshots corresponds to a given portion of multimedia content.

In an embodiment, each snapshot is a subset of the corresponding portion of multimedia content for the set of snapshots including that snapshot. As a non-limiting example, a snapshot may be a frame of a video, where such a frame is a still image taken from a given portion of the video. As another non-limiting example, a snapshot may be a sample of a set of audio content, where the sample includes an audio clip from the set of audio content. As yet another non-limiting example, a snapshot may be a video clip which is a shorter version of a video (for example, a 30-second clip of a 2-hour long video).

At S220, one or more reduced representation arrays are generated for the sets of snapshots. In an embodiment, a reduced representation array is generated for each set of snapshots such that the array effectively represents the snapshots among the respective set of snapshots. In a further embodiment, each reduced representation array is an array of elements corresponding to a respective multimedia content item (e.g., a respective video from a given timeframe) or otherwise corresponding to a given portion of multimedia content. Each element in a given reduced representation array may represent a respective portion of the corresponding multimedia content item represented by the array such as, but not limited to, a given portion of video within a certain time interval.

In a further embodiment, the elements represent respective time intervals measured from a starting point at the beginning of an hour, day, or other time period to be represented by the elements of a given array. As a non-limiting example, for a reduced representation array representing given captured in a given day (i.e., a 24-hour time period), in such an embodiment, the elements represent time intervals where the first time interval begins at midnight (i.e., at the beginning of the 24-hour time period of that day). As a further non-limiting example, the reduced representation array for any given day may include 1024 elements representing 2-second intervals (i.e., one element for every 2 seconds in a given 24-hour time period).

Each element in a reduced representation array is further associated with a respective snapshot, where the snapshot is a subset of the multimedia content item represented by the array. In an embodiment, each such element has a corresponding value indicating at least whether the portion of the multimedia content item represented by the element has a corresponding snapshot. As a non-limiting example, each element may have a value which is either 0 or a non-zero number (for example, 1), where zero represents that the portion of the multimedia content lacks a snapshot and 1 or another non-zero number represents that the portion of the multimedia content has a corresponding snapshot.

In some embodiments, the value for at least some of the elements may further represent additional information about the corresponding portion of the multimedia content item. As a non-limiting example, values such as 2, 3, and 4 may be utilized to represent respective events or attributes (e.g., attributes of objects or people shown in video) when such an event or attribute is represented by a snapshot at the time interval corresponding to the element having that value, while a value of 1 may be utilized to represent the existence of a snapshot when no such event or attribute is identified for that snapshot.

In a further embodiment, the value for at least some of the elements includes a suffix. Such a suffix may be utilized to convey additional information about the portion of the multimedia content item represented by the respective element. As a non-limiting example, a value of 1 may represent that the portion of multimedia content represented by an element has a snapshot, and a suffix affixed to that value of 1 may represent that the portion of multimedia content represented by the element further includes an event or attribute (for example, that a given portion of a video depicts an event happening or shows an object having a certain attribute) such that the elements of the reduced representation array for the video may have values like 1-1, 1-2, and so on. As a further non-limiting example, a suffix of 1 may represent a first attribute such as a purple shirt), and a suffix of 2 may represent a second attribute such as a green shirt. In such an example, a value of 1-1 for an element would indicate that the element has a snapshot and represents a portion of multimedia content showing a purple shirt, while a value of 1-2 for an element would indicate that the element has a snapshot and represents a portion of multimedia content showing a green shirt.

As noted above, the elements may utilize values which can be represented via an amount of data or otherwise a data size that is less than an amount of data or data size of the snapshots which might be represented by a given element or of any of the snapshots. That is, a value of 1 representing that a portion of multimedia content has a snapshot would use less data than the snapshot itself. Accordingly, the reduced representation arrays realized via elements having such values are reduced as compared to the portions of multimedia content they represent and, more specifically, are reduced as compared to the snapshots stored for portions of multimedia content items. Consequently, using the reduced representation arrays may allow for reducing use of computing resources. For example, providing or otherwise transmitting a reduced representation array to a user device may utilize fewer computing resources than transmitting or otherwise providing the snapshots represented by that reduced representation array such that, when the user device only accesses snapshots as needed using the reduced representation array as a guide, the user device may avoid obtaining, storing, and loading all such snapshots. Additionally, searching through the reduced representation arrays via tools provided to a language model may be performed using fewer computing resources of the tools as well as with requiring less interaction with the language model such that embodiments using language models as discussed herein may provide further improvements to computing resource usage efficiency.

In an embodiment, the elements are defined such that the elements correspond to respective portions of the multimedia content item of uniform size. That is, in such an embodiment, each element of a reduced representation array represents a portion of the multimedia content item having the same size as the portion of the multimedia content item represented by each other element of the reduced representation array. As a non-limiting example, when each element represents a respective time interval of a video, the elements may be defined such that the time interval represented by each element is the same length (for example, each element represents a portion of the video having a time interval of 2 seconds).

It should be noted that the portion of the multimedia content item represented by each element is not necessarily the same subset of the multimedia content item represented by the snapshot. As a non-limiting example, an element in a reduced representation array for a video may represent a 2-second time interval within the video (i.e., a portion of the video occurring in a certain 2-second timeframe within the video), and the snapshot for that element may be a frame of the video within that 2-second timeframe.

An example process for generating a reduced representation array which may be utilized to generate each reduced representation array is discussed further below with respect to FIG. 3.

At S230, the identified snapshots are stored with time references defined based on the generated reduced representation arrays. More specifically, as noted above, each array may include multiple elements, where each element represents a respective time interval within a given multimedia content item or other portion of multimedia content. Each snapshot may be stored in association with timestamp or timeframe corresponding to one of those time intervals, for example, a timestamp of a time at the beginning of the time interval. Such storage allows for retrieving the appropriate snapshot, for example, by identifying the snapshot stored in association with the timestamp corresponding to the time interval of a given element in a reduced representation array.

At S240, a request for one of the reduced representation arrays is received. In an embodiment, the request is a request for the array of a given multimedia content item or other portion of multimedia content such that the requested array is the reduced representation array corresponding to that portion of multimedia content. The request may be received from a requesting device such as, but not limited to, a user device (for example, the user device 150) which will display or otherwise project snapshots of multimedia content as previews of the multimedia content.

The request may indicate the multimedia content item or otherwise indicate the portion of multimedia content for which a reduced representation is requested. As a non-limiting example, when a user device receives user inputs selecting a video to be played, the user device may request the video (for example, from a content server) as well as the corresponding reduced representation array for that video (for example, from the array manager 130 or from a content server which received the array from such an array manager).

In some embodiments, the request may include or may otherwise be received as natural language text. In such embodiments, processing the request in order to identify relevant arrays may further include querying a language model such as a LLM based on the natural language text of the request.

At S250, one of the arrays is identified based on the request. More specifically, when the request indicates a given multimedia content item or portion of multimedia content, the reduced representation array for that portion of multimedia content is identified. As a non-limiting example, when the request indicates a video for which an array is requested, the identified array is the array corresponding to that video.

As noted above, in an embodiment, the request may include natural language text. To this end, in a further embodiment, identifying the array based on the request includes querying a language model and analyzing outputs of the language model in order to identify the array. The language model may return outputs indicating information about snapshots represented by the array such as, but not limited to, an identifier of the array or the media content represented by the array, whether a given portion of media content has a snapshot, timestamps of snapshots within the media content represented by the array), statistical information (for example, about a number of snapshots represented in the array or about a number of instances of a given attribute represented in the array), a combination thereof, and the like. To this end, the language model may be provided with one or more tools such as functions which are configured to access and translate reduced representation arrays which may enable the language model to interpret the arrays in order to generate outputs responsive to queries which ask questions about the arrays in natural language.

An example process which may be utilized at S250 or which otherwise includes steps that may enable a language model to respond to natural language queries with information about the reduced representation arrays is described further below with respect to FIG. 4.

At S260, the identified array is retrieved. The identified array may be retrieved, for example, from a content server (for example, the content server 140, FIG. 1) or other system or datastore which stores reduced representation arrays. When the array is retrieved from a content server, S260 may include sending a request for the reduced representation array to the content server. Otherwise, the array may be retrieved from the location in storage where it is stored.

At S270, the retrieved array is sent or otherwise provided to the requesting device for use. The array may be used, for example, in order to facilitate snapshot retrieval and, more specifically, to provide an improved efficiency snapshot retrieval. A non-limiting example process which illustrates how the retrieved array might be utilized by the requesting device is described further below with respect to FIG. 4.

In some embodiments, the array may be sent along with a translation table or set of rules to be used for translating the array. Such a translation table or set of rules may define how the array is structured (for example, what time intervals are represented by the array), what multimedia content item or portion of multimedia content is represented by the array, what the values of the elements represent, a location of the snapshots represented in the array, combinations thereof, and the like. Accordingly, the translation table or set of rules may allow the receiving device or system to dynamically translate the arrays in order to retrieve snapshots as needed. Alternatively, the translation table or set of rules may have been sent previously before the array is sent. This may allow, for example, for avoiding resending the translation table or set of rules in situations where the same array is requested by a given device or system multiple times.

As discussed further below with respect to FIG. 4, in some embodiments, a language model may be queried, and outputs of the language model may flag certain portions of the arrays, for example flagging certain timestamps within a video represented by values in an array representing the video as showing certain attributes. In such embodiments, the array may be sent along with data to be used for generating one or more user interface elements based on the array and the media content represented by the array. To this end, in such an embodiment, S270 may further include generating and sending such overlay data. The overlay data may indicate, for example, how to visually indicate certain attributes (for example, using markers of certain shapes, colors, etc.) represented by an array in the media content corresponding to that array.

Figure 3:
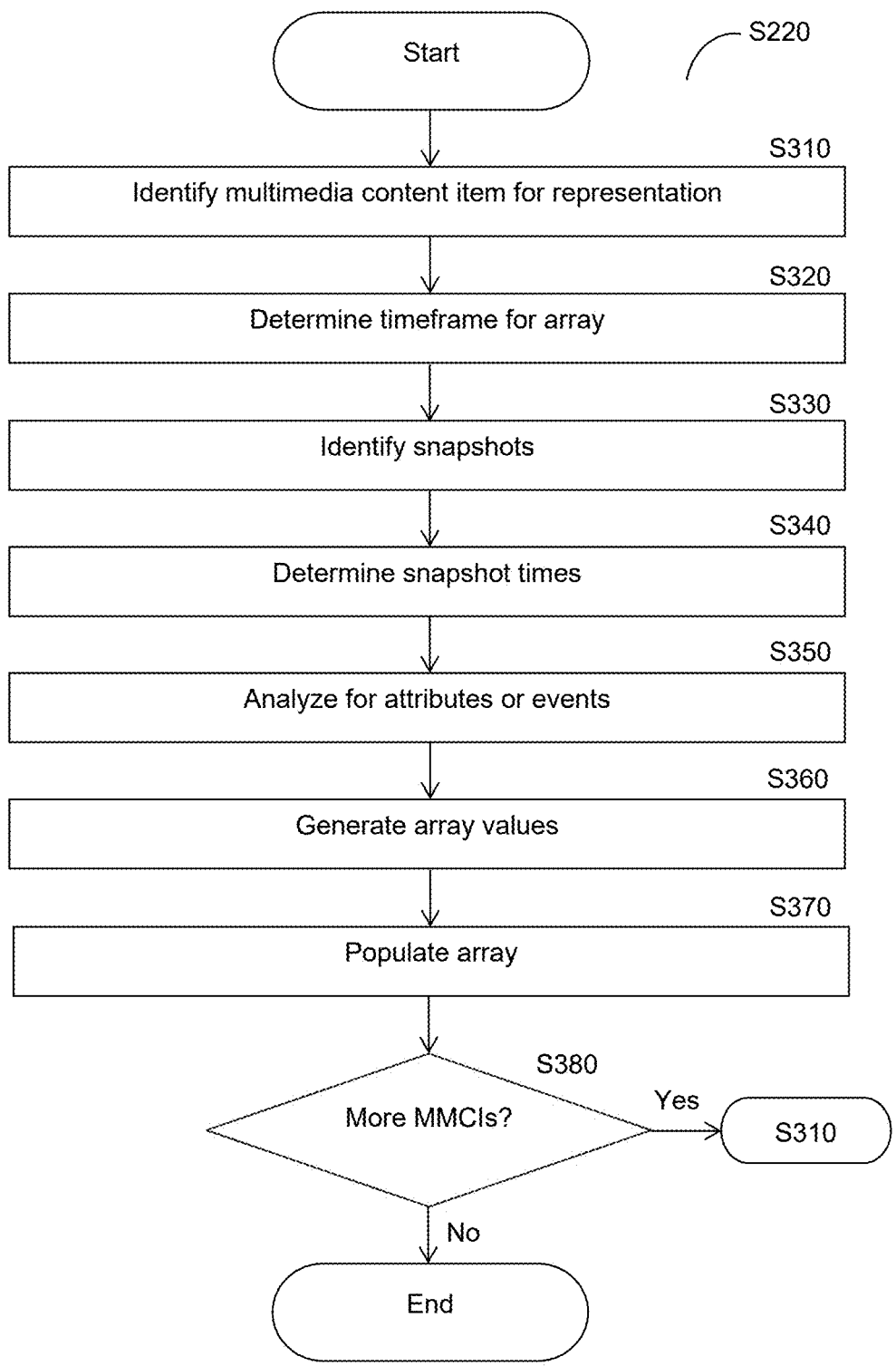
FIG. 3 is a flowchart illustrating a method for generating a reduced representation array according to an embodiment.

FIG. 3 is a flowchart S220 illustrating a method for generating a reduced representation array according to an embodiment.

At S310, a multimedia content item to be represented using a reduced representation array is identified. The multimedia content item may be a multimedia content item managed by a content server or otherwise a multimedia content item for which previews in forms such as snapshots are desired. That is, the multimedia content item is a portion of multimedia content for which snapshots or other preview content is to be represented via a reduced representation in order to allow for efficiently identifying and retrieving such preview content.

In some embodiments, each multimedia content item is identified such that the beginning of the multimedia content item aligns with the beginning of a discrete time period such as an hour, day, and the like. As a non-limiting example, multimedia content items may be videos captured during days, and each multimedia content item may be identified as a set of video collected during a given 24-hour period which has a beginning aligned with the beginning of that period (midnight).

At S320, a timeframe for an array is determined. The determined timeframe is a timeframe of the multimedia content item and includes an amount of time of the multimedia content item (for example, an amount of time of a given video). The determined timeframe may further include start and end times. The timeframe for the array may be determined based on metadata of the multimedia content item, for example, metadata indicating information such as an amount of time as well as start and end times.

At S330, snapshots for the multimedia content item are identified. As noted above, in an embodiment, each snapshot is a subset of the multimedia content item which may be used, for example, as a preview of the multimedia content item or a portion of the multimedia content item. As a non-limiting example, a frame of a video may be used as a preview of the video or of a given portion of the video (for example, a portion including a certain time interval of the video). The snapshots may be stored in association with the multimedia content item or otherwise indicated (for example, in metadata) as being associated with a certain multimedia content item.

At S340, times of the snapshots are determined with respect to the timeframe of the multimedia content item. That is, for each snapshot, a corresponding time is determined within a timeframe of the multimedia content item. The time for each snapshot may be determined based on a timestamp of the snapshot, that is, a timestamp of the portion of the multimedia content item being used as the snapshot. As a non-limiting example, for snapshots which are frames of a video multimedia content item, the time of each snapshot may be determined based on a timestamp corresponding to the respective frame.

In an embodiment, the time for each snapshot is a time interval or other portion of time among the timeframe of the multimedia content item. In a further embodiment, the time of each snapshot is a time interval beginning, ending, or otherwise including the timestamp of the portion of the multimedia content item represented by the snapshot. As a non-limiting example, different snapshots of a video may be video frames selected from different time intervals within the video, and the determined time for each snapshot is one of the time intervals within the video which includes the video frame of the snapshot.

At optional S350, the multimedia content item may be analyzed for attributes, events, or both. In an embodiment, analyzing the multimedia content item includes applying one or more machine learning models trained to identify such attributes, events, or both. As a non-limiting example, such a machine learning model may be trained to classify videos or portions of videos into classifications representing certain attributes, certain events, lack of certain attributes or events, and the like.

A non-limiting example process which may be utilized to analyze multimedia content for attributes using machine learning is discussed further in U.S. patent application Ser. No. 18/539,897, assigned to the common assignee, the contents of which are hereby incorporated by reference. Such processes may be further used to custom-define events or attributes as discussed therein, which may allow for using reduced representation arrays to convey information about these custom-defined events and attributes.

As discussed further below, values of the reduced representation array may be utilized to indicate whether a given portion of the multimedia content item reflects one of these attributes or events.

At S360, a set of values to be included as elements in a reduced representation array for the multimedia content item is generated. As noted above, in an embodiment, the multimedia content item has a timeframe made up of multiple time intervals, and each time interval may have a corresponding snapshot. Accordingly, in an embodiment, the set of values includes a value for each such time interval. In a further embodiment, each value at least indicates whether the respective time interval has a corresponding snapshot or not. As a non-limiting example, a time interval without a snapshot may be assigned a value of 0, while a time interval with a snapshot may be assigned a value of 1.

In a further embodiment, the values may represent additional information beyond whether or not a time interval has a corresponding snapshot. As a non-limiting example, values such as 2, 3, and 4 may be utilized as indicators that the portion of the multimedia content item corresponding to a given time interval demonstrates an attribute or event such as an attribute or event determined at S350. As a further example, values such as 2, 3, and 4 may be utilized to represent respective events or attributes (e.g., attributes of objects or people shown in video) when such an event or attribute is represented by a snapshot at the time interval corresponding to the element having that value, while a value of 1 may be utilized to represent the existence of a snapshot when no such event or attribute is identified for that snapshot.

In an embodiment, any or all of the values may further include a suffix. In a further embodiment, the suffix may be realized as one or more digits beyond one or more base digits, where the base digits may indicate, for example, whether the time interval has a snapshot. In yet a further embodiment, the suffix may be separated by the base digits using a separator, which may be a character acting to separate a portion of the value representing the base digits from a portion of the value representing the suffix. As a non-limiting example, a hyphen character "-" may be used as a separator such that the values may take forms such as "1-1," "1-2," and the like.

The suffixes may be utilized to further clarify information about the portions of the multimedia content item. For example, a suffix may be used to indicate whether a given time interval demonstrates an event or attribute, while a base digit may be used to indicate whether the given time interval has a snapshot or not. In this regard, the suffixes may be used to effectively provide more specific detail about the snapshots such as whether the snapshot likely reflects a particular kind of event or attribute as opposed to snapshots which have been created for a given time interval but do not represent such an event or attribute. This may allow, for example, conveying more information about whether a given snapshot demonstrates certain information of interest rather than only conveying that the snapshot exists.

At S370, an array is populated with the generated set of values. In an embodiment, the array is initialized with a number of elements equal to or greater than the number of values among the set of values, and the values among the set of values are included as values of respective elements of the array.

Figure 4:
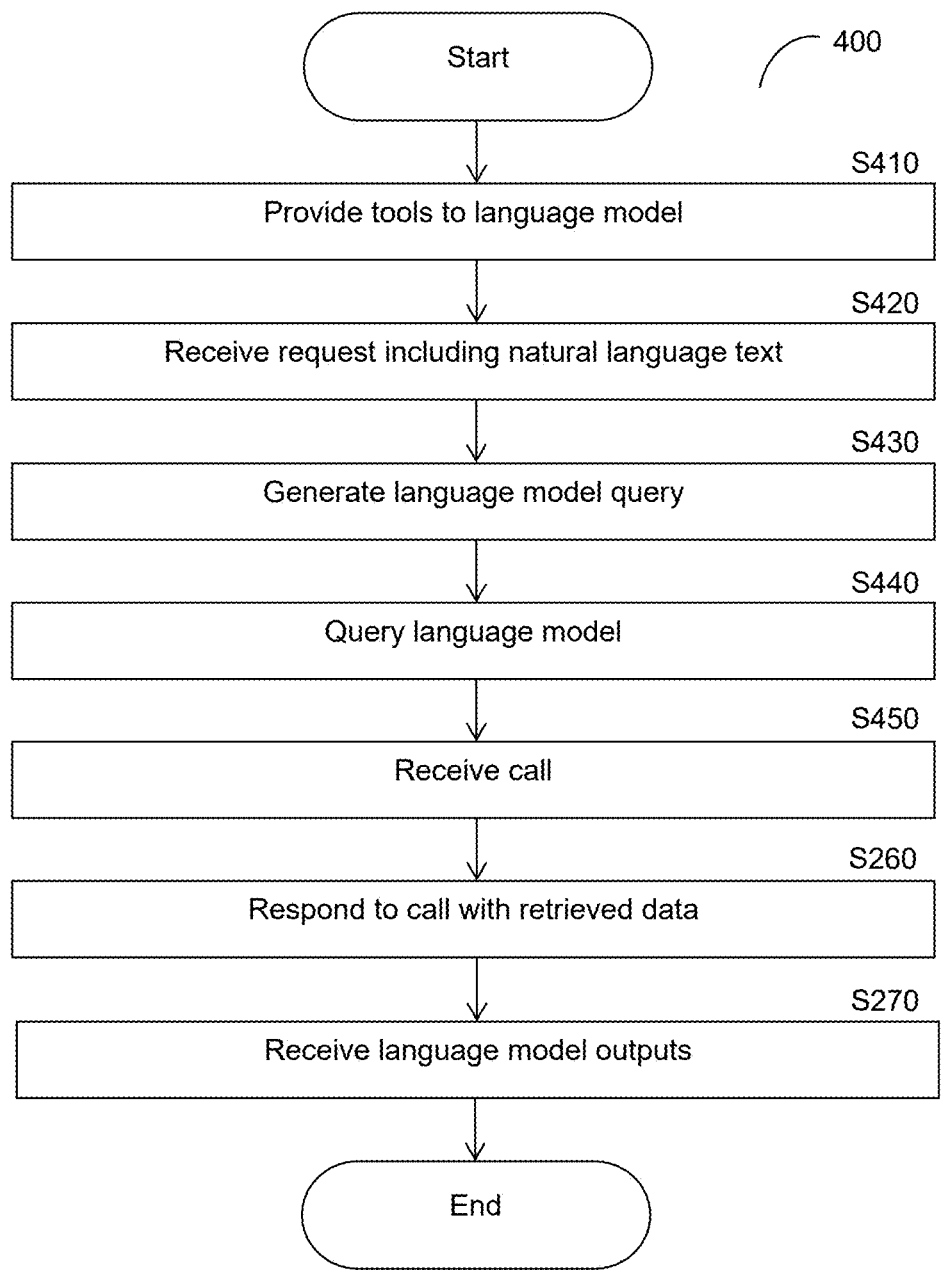
FIG. 4 is an example flowchart illustrating a method for responding to natural language queries with respect to reduced representation arrays according to an embodiment.

FIG. 4 is a flowchart 400 illustrating a method for responding to natural language queries with respect to reduced representation arrays according to an embodiment. In an embodiment, the method is performed by the array manager 130, FIG. 1.

At S410, a language model is provided one or more tools to be used for responding to queries related to reduced representation arrays as described herein. The tools may be or may include functions configured to access and analyze the arrays in order to provide information such as, but not limited to, arrays which are responsive to queries, media content represented by such arrays, which portions of arrays or the media content represented by arrays contain snapshots, which arrays or portions of arrays contain snapshots demonstrating certain attributes, statistical information about the arrays (for example, a number of instances of snapshots having certain attributes or a number of snapshots represented in a given array), combinations thereof, and the like.

In an embodiment, providing the language model with the tools includes providing the language model with text to be used for selecting which tools to call, for calling the tools, for generating inputs to be used when calling tools, a combination thereof, and the like. To this end, providing access to the tools for the language models may further include providing a textual description of one or more aspects of each tool such as, but not limited to, text to be used for calling the tool, example inputs, example outputs, a textual explanation of how the function is used, combinations thereof, and the like. The text may be, but is not limited to, predetermined text associated with each tool to be provided to the language model for a given use case.

At S420, a request including natural language text is received. The request may be received, for example, from a user of a user device (for example, the user device 150, FIG. 1). The request may be a request for media content, portions of media content such as snapshots, information about the media content or portions thereof, combinations thereof, and the like.

At S430, a language model query is generated based on the request. In an embodiment, the query includes the natural language text of the request. The query is utilized to query the language model.

At S440, the language model is queried using the generated query. To this end, in an embodiment, the query is transmitted to the language model, for example, by transmitting the query to a model server (for example, the model server 160, FIG. 1) which is configured to access and query the language model.

At S450, a call is received. In an embodiment, the call is a call to one of the tools provided to the language model. The call may include, but is not limited to, text indicating the tool being called, inputs to be provided to the tool, and the like. As a non-limiting example, the call may be for data related to a particular reduced representation array, for data related to a given set of reduced representation arrays, for data related to portions of arrays or media content demonstrating certain aspects (for example, having or lacking a snapshot, demonstrating certain attributes, etc.), combinations thereof, and the like.

In an embodiment, the call is received via a first set of language model outputs. That is, the call may be realized via natural language text generated by the language model in a format corresponding to the tool being called and indicating the inputs to be used for calling the tool.

At S460, data is retrieved based on the call and provided to the language model. The retrieved data may be or may include, but is not limited to, certain arrays, identifiers of media content represented by certain arrays, certain portions of arrays, statistical information about the arrays, combinations thereof, and the like. In an embodiment, the data is retrieved by accessing one or more storage locations containing reduced representation arrays using the called functions. In a further embodiment, the called functions are used to interpret the arrays in these storage locations in order to retrieve the data that the language model called the functions for.

At S470, a set of language model outputs which are responsive to the request are received. The set of language model outputs may indicate certain arrays or portions of arrays, information related to arrays or the media content represented by those, both, and the like. The language model outputs may be provided to a user device which sent the request received at S420 or otherwise utilized for responding to the request.

In some embodiments, the language model outputs may flag certain portions of the arrays, which in turn may be utilized to generate an overlay for media content or otherwise visually represent the flagged portions of the arrays when the media content is displayed. As a non-limiting example, natural language text of a request may be "please show me video of people wearing yellow shirts" where yellow is an attribute represented by one of the values of a reduced representation array. The language model may provide outputs indicating which media content items and which timestamps or other portions of those media content items are flagged as including people wearing yellow shirts based on the data retrieved using function calls. In turn, the language model outputs may be utilized to modify video or other media content items showing people wearing yellow shirts, or to generate an overlay for such media content. The modified media content or overlay may show, as a non-limiting example, a bar representing a timeline within a video with yellow marks representing timestamps in the video where people wearing yellow shirts are shown.

As noted above, functions may be called via a first set of language model outputs. Accordingly, the set of language model outputs which are responsive to the request may be a second set of language model outputs.

It should be noted that the steps of FIG. 4 are depicted in a particular order and in one iteration for simplicity purposes, but that various embodiments discussed with respect to FIG. 4 are not necessarily limited as such. As non-limiting examples, the language model may be provided with access to tools after a request is received, or the language model may call functions over multiple iterations without departing from the scope of the disclosure.

Figure 5:
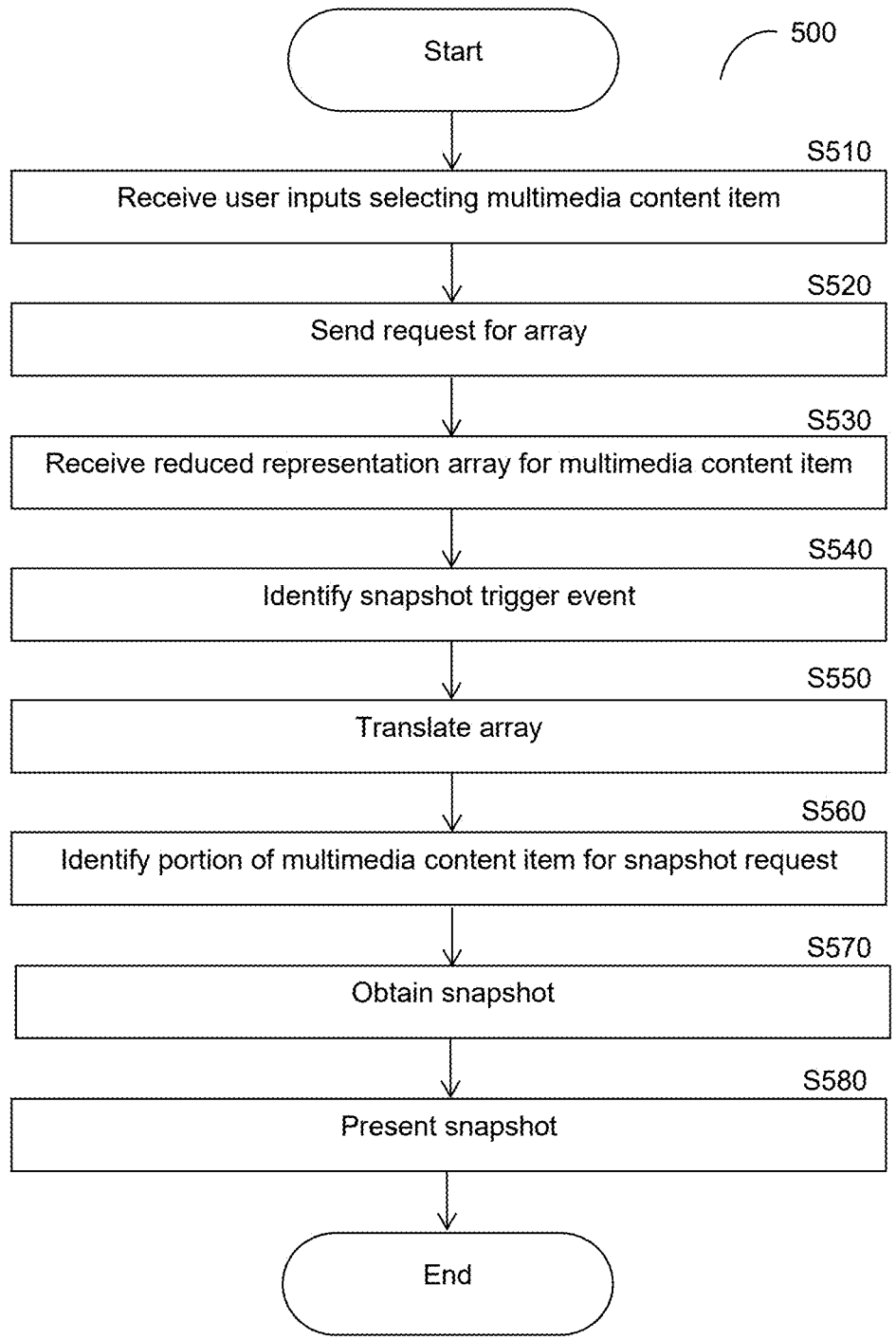
FIG. 5 is a flowchart illustrating a method for obtaining snapshots based on reduced representation arrays according to an embodiment.

FIG. 5 is a flowchart 500 illustrating a method for obtaining snapshots based on reduced representation arrays according to an embodiment. In an embodiment, the method is performed by the user device 150 (for example, using hardware such as the hardware layer 700, FIG. 7).

At S510, user inputs selecting a multimedia content item are received. The user inputs may indicate a multimedia content item such as a video or other portion of multimedia content in the form of a specific multimedia content item or a timeframe of the multimedia content item. The selected multimedia content item may have a corresponding timeframe and have one or more associated snapshots representing respective portions of the multimedia content item. The selected multimedia content item may be represented by a reduced representation array, for example, an array including values which at least indicate whether respective portions of the multimedia content item have corresponding snapshots.

At S520, a request for an array associated with the selected multimedia content item is sent to a system which manages or otherwise is configured to access reduced representation arrays (for example, the array manager 130, FIG. 1). Such a system may return the array corresponding to the multimedia content item for use in identifying and retrieving snapshots. To this end, the request may indicate the multimedia content item, a timeframe associated with the multimedia content item, both, and the like.

At S530, a reduced representation array associated with the multimedia content item is received. The reduced representation array may be generated as described above with respect to FIGS. 2-3.

In an embodiment, the reduced representation array is received along with translation data to be used for translating the reduced representation array. Such translation data may be or may include, but is not limited to, a translation table, a set of translation rules, both, and the like. The translation table or translation rules may define a set of potential values or portions of values and a corresponding meaning of each value or portion of a value (for example, whether the value or portion thereof represents a snapshot or not, any attributes or events represented by the value or portion thereof, etc.). The translation rules may further define a system or location from which the snapshots may be obtained, which in turn may be utilized to obtain the snapshots (for example, by requesting a snapshot from such a system or retrieving the snapshot from such a location in storage).

At S540, a snapshot trigger event is identified. The snapshot trigger event may be defined with respect to, for example, certain user inputs or certain conditions defined with respect to playing of the multimedia content item. The snapshot trigger event is or includes one or more conditions that, when present, should trigger displaying or otherwise providing a snapshot. As a non-limiting example, a user hovering their cursor or holding their finger in a certain position on a slider used to navigate within a video for at least a certain amount of time may be such a snapshot trigger event. That is, hovering over a position on the slider representing a particular timestamp in the video may trigger a snapshot for a portion of the video corresponding to that timestamp.

In an embodiment, the snapshot trigger events are defined with respect to different portions of a multimedia content item such that each snapshot trigger event triggers a respective snapshot. That is, a given snapshot trigger event is defined with respect to a portion of a multimedia content item (for example, a portion of the multimedia content item represented by a position on screen that was hovered over). In other words, a given snapshot event corresponds to a portion of a multimedia content item which may have a snapshot, where whether the portion of the multimedia content item has a snapshot is represented by the reduced representation array for the multimedia content item.

At S550, the reduced representation array is translated based on the translation data. In an embodiment, the reduced representation array is translated with respect to the snapshot trigger event such that the translation yields an element in the array corresponding to a portion of the multimedia content item related to the snapshot trigger event. Such an element has a value at least indicating whether the corresponding portion of the multimedia content item has a snapshot, and may further indicate whether the corresponding portion of the multimedia content demonstrates a certain event or attribute.

In an embodiment, S550 includes looking up a value of the element related to the snapshot trigger event within a translation table in order to determine what the value indicates. Alternatively or in combination, S550 includes applying a set of translation rules in order to determine what the value indicates. The resulting determination of what the value indicates may be used to determine whether a snapshot is to be retrieved, whether any additional information should be presented alongside with the snapshot (for example, text or another visual indicator of an event or attribute), and the like.

At S560, a portion of the multimedia content item for which a snapshot is to be requested is identified based on the translation. The identified portion of the multimedia content item may be, for example, but not limited to, a given time interval. The identified portion may be utilized in order to communicate which snapshot to request from an array manager (for example, the array manager 130, FIG. 1). That is, the time interval or other portion of the multimedia content item may be indicated in a request to a system which manages or otherwise accesses and provides arrays in order to allow that system to identify the snapshot to be provided.

At S570, a snapshot is obtained based on the identified portion of the multimedia content item. In an embodiment, obtaining the snapshot includes transmitting a request for a snapshot which indicates the identified portion of the multimedia content item. The request may be transmitted to, for example, an array manager (for example, the array manager 130) or other system configured to access and provide snapshots from storage. The array manager, in turn, may provide the snapshot corresponding to the portion of the multimedia content item indicated in the request.

At S580, the snapshot is displayed or otherwise presented. As a non-limiting example, when the snapshot is a still image, the still image may be displayed on a screen of a user device. The presented snapshot may act as a preview of the identified portion of the multimedia content item.

As noted above, in some embodiments, a language model may be queried by an array manager which manages arrays, and outputs of the language model may flag certain portions of the arrays, for example flagging certain timestamps within a video represented by values in an array representing the video as showing certain attributes. In such embodiments, the array may be received along with data to be used for generating one or more user interface elements based on the array and the media content represented by the array. To this end, in such an embodiment, S580 may further include generating one or more display elements based on the overlay data and causing the display elements to be displayed over or otherwise with the snapshot. As a non-limiting example, the display elements may be generated in order to visually represent which portions of the media content have snapshots demonstrating certain attributes via a timeline with markers representing snapshots with those attributes, and the snapshot displayed at S580 may be a snapshot corresponding to a timestamp of a portion of the media content corresponding to one of the markers that the user hovered over.

Figure 6:
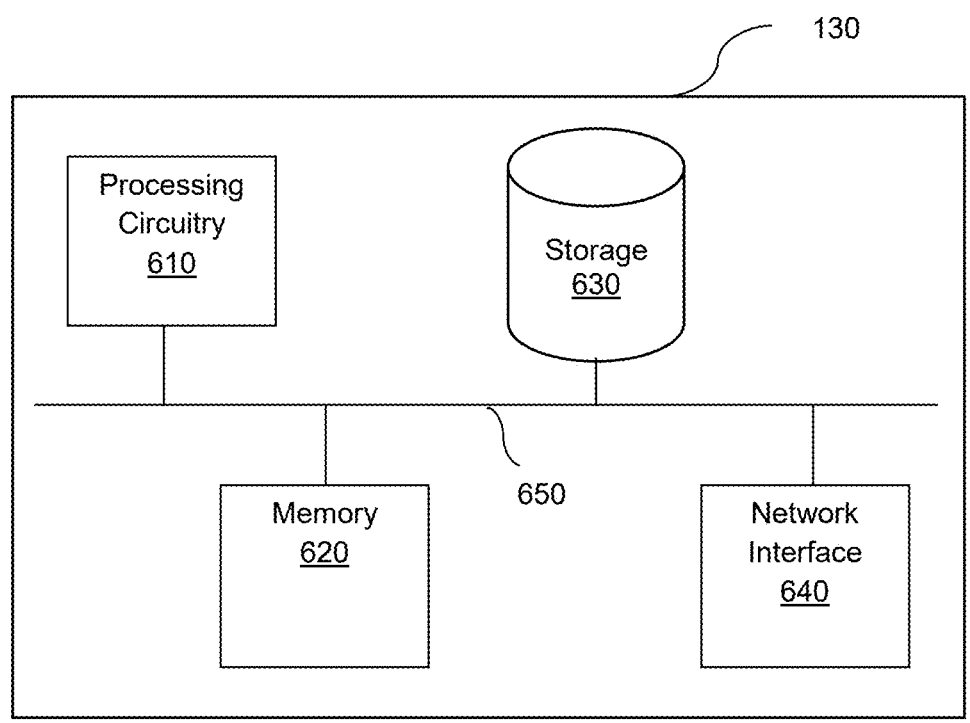
FIG. 6 is a schematic diagram of an array manager according to an embodiment.

FIG. 6 is an example schematic diagram of an array manager 130 according to an embodiment. The array manager 130 includes a processing circuitry 610 coupled to a memory 620, a storage 630, and a network interface 640. In an embodiment, the components of the array manager 130 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the array manager 130 to communicate with other systems, devices, components, applications, or other hardware or software components, for example as described herein.

It should be understood that the embodiments described herein are not limited to the specific architecture illustrated in FIG. 6, and other architectures may be equally used without departing from the scope of the disclosed embodiments.

Figure 7:
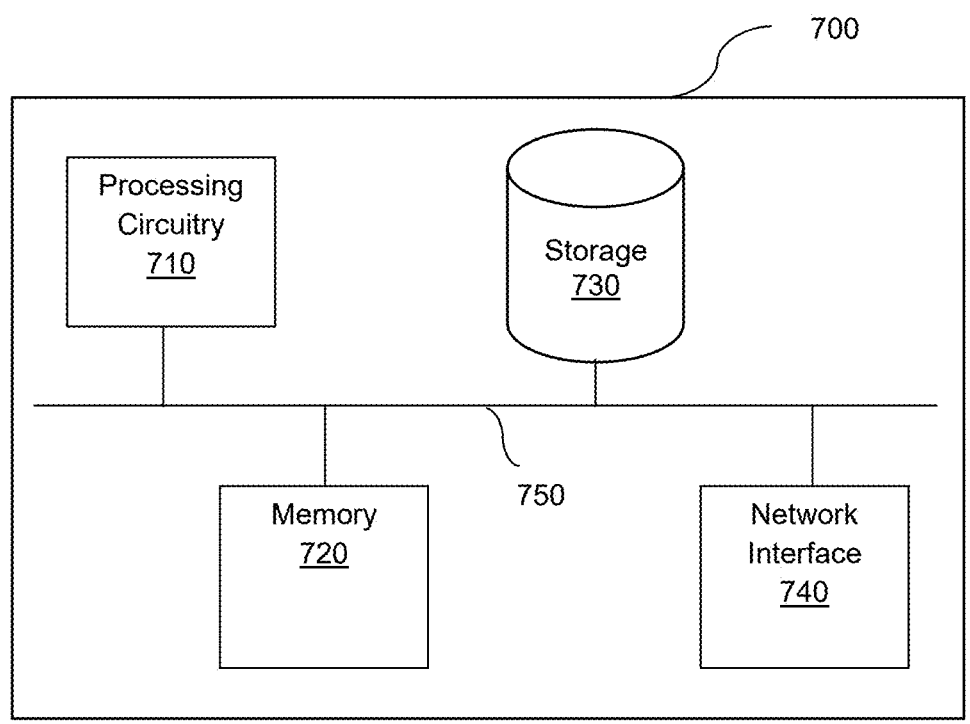
FIG. 7 is a schematic diagram of a hardware layer used to realize a user device according to an embodiment.

FIG. 7 is an example schematic diagram of hardware layer 700 which may be utilized to realize a user device (for example, the user device 150) according to an embodiment. The hardware layer 700 includes a processing circuitry 710 coupled to a memory 720, a storage 730, and a network interface 740. In an embodiment, the components of the hardware layer 700 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile (e.g., random access memory, etc.), non-volatile (e.g., read only memory, flash memory, etc.), or a combination thereof.

In one configuration, software for implementing one or more embodiments disclosed herein may be stored in the storage 730. In another configuration, the memory 720 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710, cause the processing circuitry 710 to perform the various processes described herein.

The storage 730 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 740 allows the hardware layer 700 to communicate with other systems, devices, components, applications, or other hardware or software components, for example as described herein.

It should be understood that the embodiments described herein are not limited to the specific architecture illustrated in FIG. 7, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for content management, comprising:
identifying a plurality of snapshots for a multimedia content item, wherein each snapshot is a subset of the multimedia content item corresponding to a portion of the multimedia content item among a plurality of portions of the multimedia content item;
generating an array including a plurality of elements based on the multimedia content item and the plurality of snapshots, wherein each element of the plurality of elements corresponds to a respective portion of the plurality of portions of the multimedia content item, wherein each element has a value indicating whether the corresponding portion of the multimedia content item has a snapshot of the plurality of snapshots, wherein each element has a data size that is less than a data size of each snapshot of the plurality of snapshots; and
providing the array, wherein the provided array is utilized to retrieve at least one snapshot of the plurality of snapshots in order to present the retrieved at least one snapshot.

2. The method of claim 1, further comprising:
storing the plurality of snapshots with a plurality of time references, wherein each time reference is utilized to retrieve a corresponding snapshot of the plurality of snapshots when the array is provided.

3. The method of claim 1, wherein the array is provided based on a set of outputs of a language model, further comprising:
querying the language model based on a request including natural language text in order to obtain the set of outputs of the language model, wherein the set of outputs of the language model indicates the array.

4. The method of claim 3, further comprising:
providing at least one tool to the language model, wherein the language model is configured to utilize the at least one tool in order to access data related to the array, wherein the language model is configured to generate the set of outputs of the language model using the data related to the array.

5. The method of claim 1, further comprising:
determining a timeframe for the array based on metadata of the multimedia content item, wherein the array is generated based further on the determined timeframe, wherein the timeframe for the array has a start time corresponding to a beginning of a day and an end time corresponding to an end of the day.

6. The method of claim 1, further comprising:
receiving a request indicating a multimedia content item from a requesting device; and
identifying the array based on the request, wherein the identified array is provided to the requesting device.

7. The method of claim 1, wherein the value of at least a portion of the plurality of elements further includes a suffix, wherein each suffix indicates at least one characteristic of the element having the value including the suffix.

8. The method of claim 7, wherein each suffix indicates that the element having the value including the suffix demonstrates any of: an event, and an attribute.

9. The method of claim 1, wherein the value of each element is a binary value.

10. A non-transitory computer-readable medium having stored thereon instructions for causing a processing circuitry to execute a process, the process comprising:
identifying a plurality of snapshots for a multimedia content item, wherein each snapshot is a subset of the multimedia content item corresponding to a portion of the multimedia content item among a plurality of portions of the multimedia content item;
generating an array including a plurality of elements based on the multimedia content item and the plurality of snapshots, wherein each element of the plurality of elements corresponds to a respective portion of the plurality of portions of the multimedia content item, wherein each element has a value indicating whether the corresponding portion of the multimedia content item has a snapshot of the plurality of snapshots, wherein each element has a data size that is less than a data size of each snapshot of the plurality of snapshots; and
providing the array, wherein the provided array is utilized to retrieve at least one snapshot of the plurality of snapshots in order to present the retrieved at least one snapshot.

11. A system for content management, comprising:
a processing circuitry; and
a memory, the memory containing instructions that, when executed by the processing circuitry, configure the system to:
identify a plurality of snapshots for a multimedia content item, wherein each snapshot is a subset of the multimedia content item corresponding to a portion of the multimedia content item among a plurality of portions of the multimedia content item;
generate an array including a plurality of elements based on the multimedia content item and the plurality of snapshots, wherein each element of the plurality of elements corresponds to a respective portion of the plurality of portions of the multimedia content item, wherein each element has a value indicating whether the corresponding portion of the multimedia content item has a snapshot of the plurality of snapshots, wherein each element has a data size that is less than a data size of each snapshot of the plurality of snapshots; and
provide the array, wherein the provided array is utilized to retrieve at least one snapshot of the plurality of snapshots in order to present the retrieved at least one snapshot.

12. The system of claim 11, wherein the system is further configured to:
store the plurality of snapshots with a plurality of time references, wherein each time reference is utilized to retrieve a corresponding snapshot of the plurality of snapshots when the array is provided.

13. The system of claim 11, wherein the array is provided based on a set of outputs of a language model, wherein the system is further configured to:
query the language model based on a request including natural language text in order to obtain the set of outputs of the language model, wherein the set of outputs of the language model indicates the array.

14. The system of claim 13, wherein the system is further configured to:
provide at least one tool to the language model, wherein the language model is configured to utilize the at least one tool in order to access data related to the array, wherein the language model is configured to generate the set of outputs of the language model using the data related to the array.

15. The system of claim 11, wherein the system is further configured to:
determine a timeframe for the array based on metadata of the multimedia content item, wherein the array is generated based further on the determined timeframe, wherein the timeframe for the array has a start time corresponding to a beginning of a day and an end time corresponding to an end of the day.

16. The system of claim 11, wherein the system is further configured to:
receive a request indicating a multimedia content item from a requesting device; and
identify the array based on the request, wherein the identified array is provided to the requesting device.

17. The system of claim 11, wherein the value of at least a portion of the plurality of elements further includes a suffix, wherein each suffix indicates at least one characteristic of the element having the value including the suffix.

18. The system of claim 17, wherein each suffix indicates that the element having the value including the suffix demonstrates any of: an event, and an attribute.

19. The system of claim 11, wherein the value of each element is a binary value.

* * * * *